July 1, 1941.  D. E. ROSS  2,247,410

HYDRAULIC COUPLING DEVICE

Filed July 29, 1938  5 Sheets-Sheet 1

INVENTOR.
DAVID E. ROSS
BY *Dike, Calvert & Gray*
ATTORNEYS.

July 1, 1941.   D. E. ROSS   2,247,410
HYDRAULIC COUPLING DEVICE
Filed July 29, 1938   5 Sheets-Sheet 2
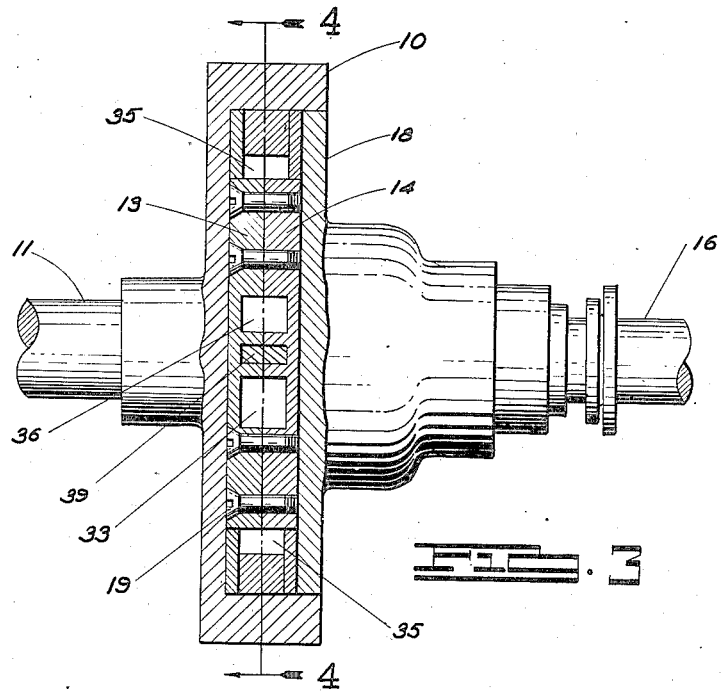
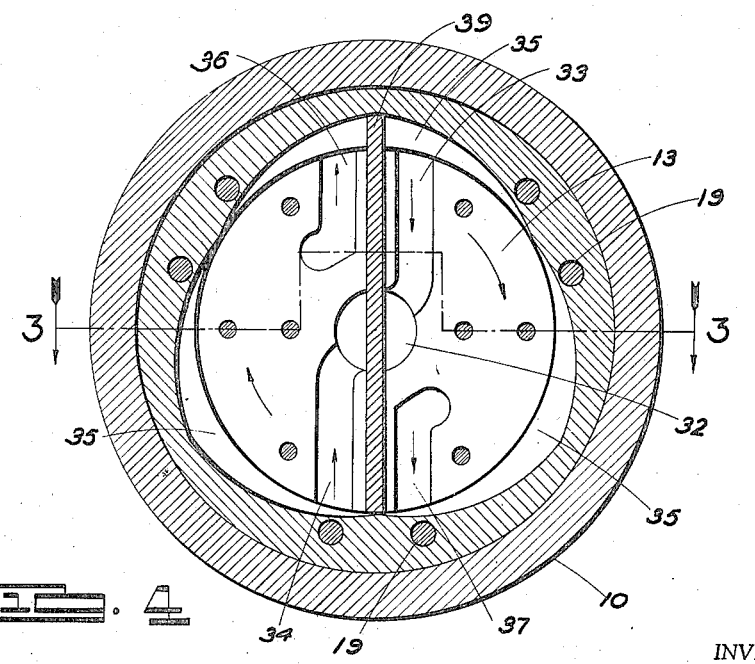
INVENTOR.
DAVID E. ROSS
BY Dike, Calvert & Gray
ATTORNEYS.

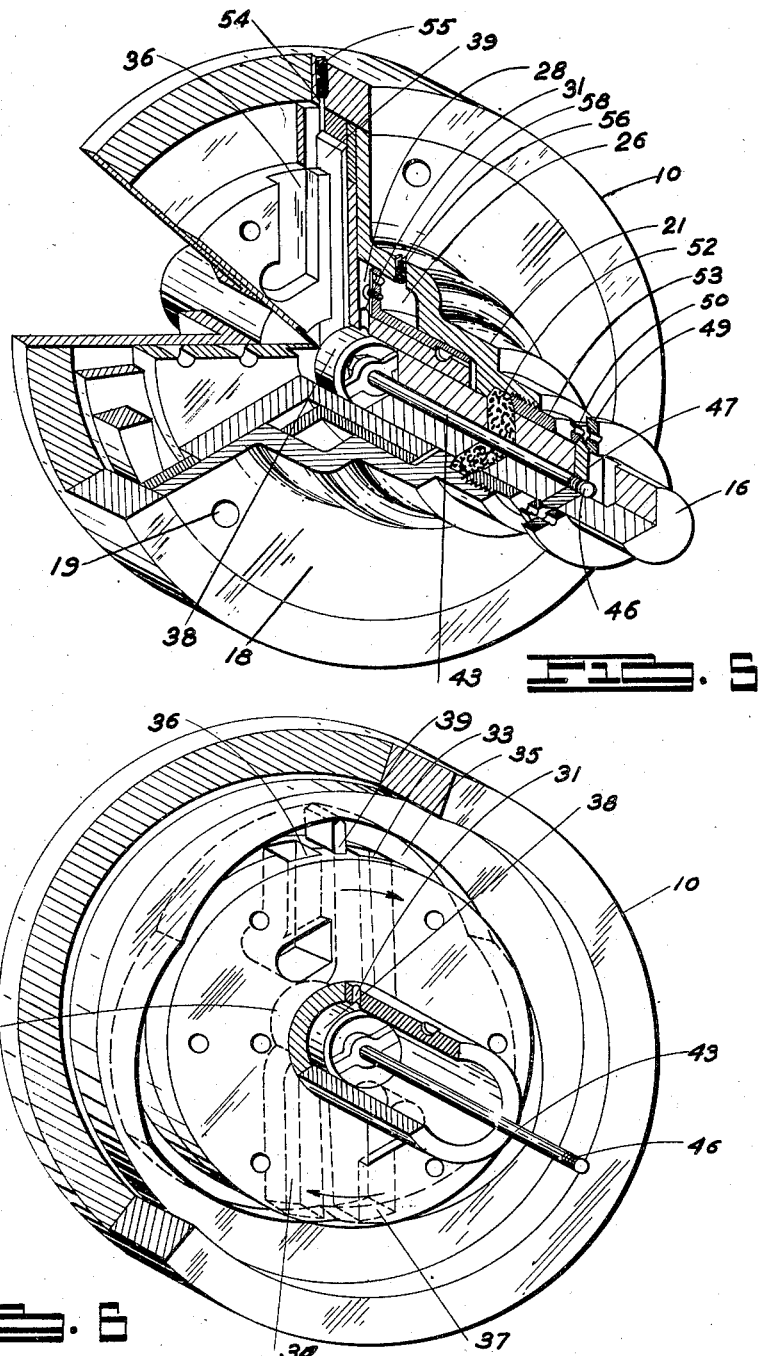

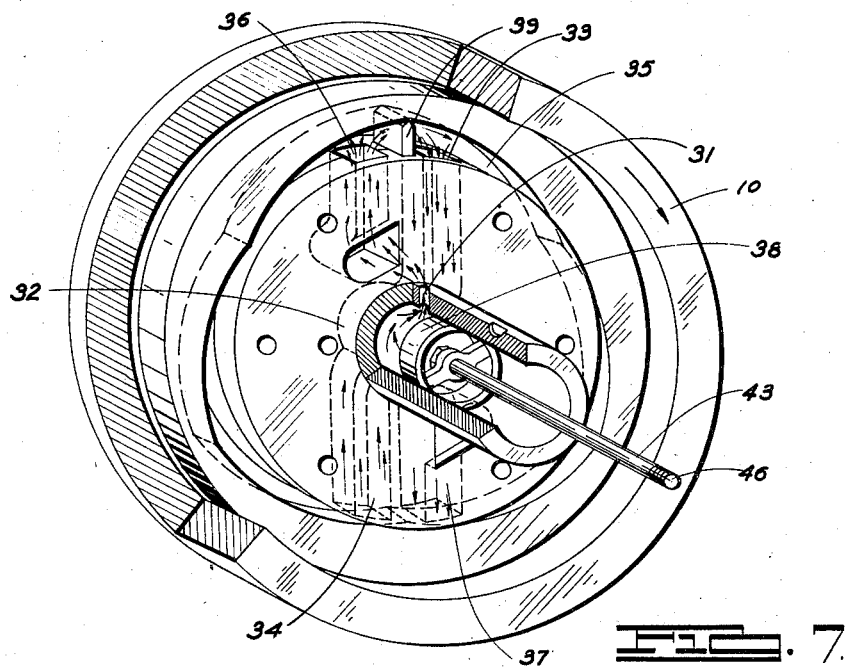
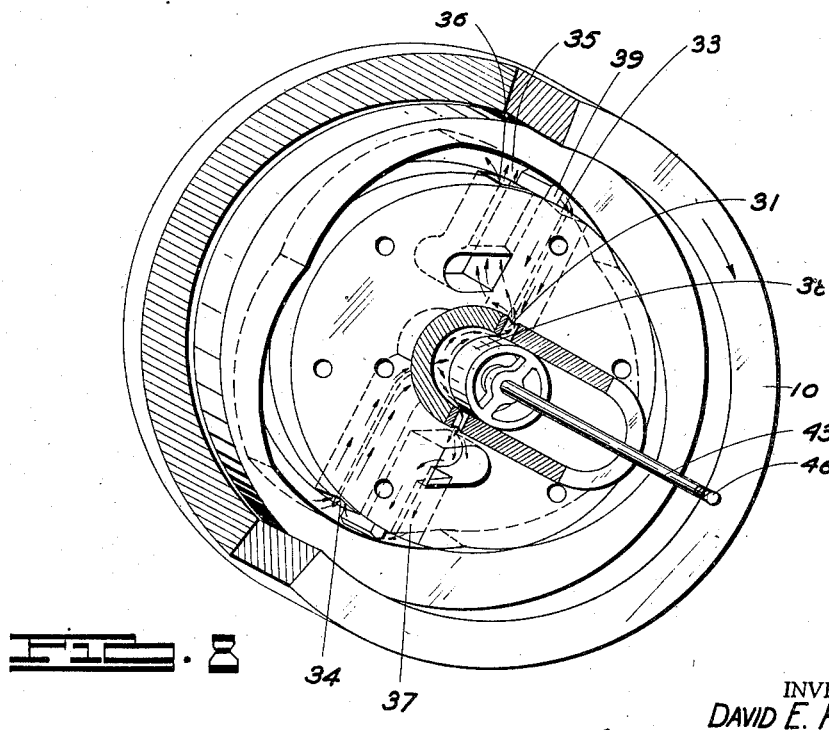

July 1, 1941.                D. E. ROSS                2,247,410
                     HYDRAULIC COUPLING DEVICE
                  Filed July 29, 1938        5 Sheets-Sheet 5
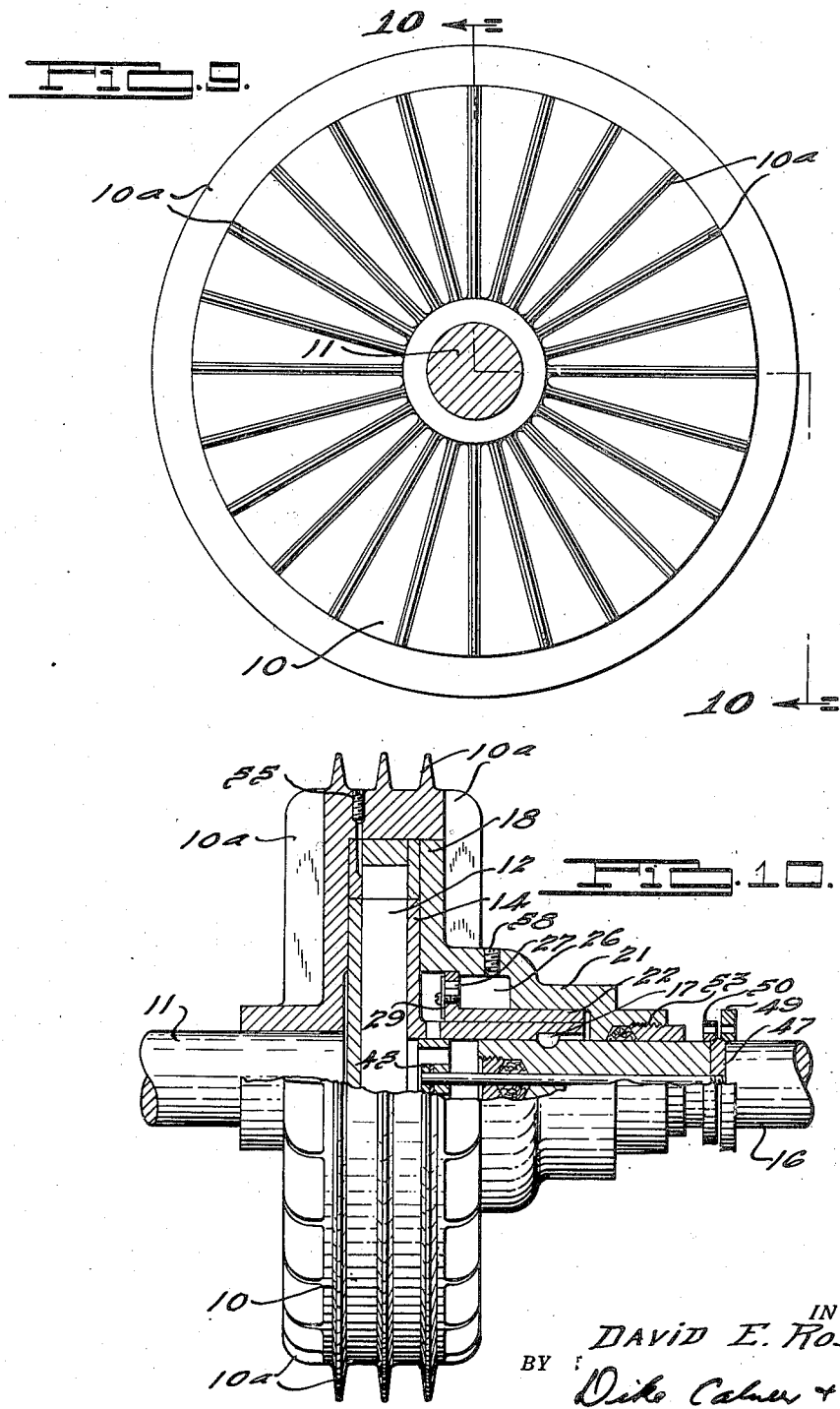

Patented July 1, 1941

2,247,410

UNITED STATES PATENT OFFICE 2,247,410

HYDRAULIC COUPLING DEVICE

David E. Ross, La Fayette, Ind.

Application July 29, 1938, Serial No. 221,893

9 Claims. (Cl. 192—58)

The present invention relates to a hydraulic device, which in one of its embodiments is particularly desirable in providing a coupling which is adapted to connect a driving and driven member for the transmission under controlled conditions of rotative effort or torque. The device is so constructed that the transmission of rotative effort or torque will occur when the connected members are revolving at either the same or at different speeds. Provision also is made to permit relative rotation of the connected members without the transmission of torque. In the first instance the device of the present invention provides either a positive direct driving coupling or a speed reducing coupling. In the second instance it acts as a clutch.

The device embodying the present invention in general consists preferably of a cylindrical casing in which a contoured chamber is provided. A rotor is mounted in the chamber. A flow of any suitable hydraulic fluid through the rotor and the chamber is provided and is controlled in such a manner that relative movement of the rotor and the casing is permitted or may be prevented as desired.

A principal object of the present invention is to provide a hydraulic device of an improved and simplified design which may be used selectively as a direct drive coupling, a speed reducer, or a clutch, the device also providing means for varying at will the velocity ratio of the driving to the driven member.

Another object of the present invention is to provide a hydraulic device useful as a coupling, speed reducer, or clutch, which is of balanced construction throughout and in which provision is made to assure a balanced operation of the device during all its various cycles of operation.

Another object of the present invention is to provide a hydraulic device which is of the self-contained liquid pump type and in which the flow of the hydraulic fluid is effected by changes in the relative positions and volumes of the hydraulic fluid to produce differences in pressure generated in the device and in the point of application of such pressures on the various elements of the device.

Another object of the present invention is to provide a hydraulic device in which the principle of an incremental fulcrum is employed to compensate for variations in the rate of flow of the hydraulic fluid relative to the operative parts of the device, whereby operation of the device is dependent upon the placement and size of columns of the hydraulic fluid rather than upon the application of pressures built up in the hydraulic fluid by external means outside of the device.

A further object of the present invention is to provide a hydraulic device in which the capacity of the pumping chambers is varied to compensate for and to balance the controlled changes in volume of the hydraulic fluid passing therethrough.

Other objects of this invention will appear in the following description and appended claims, reference being had to the accompanying drawings forming a part of this specification, wherein like reference characters designate corresponding parts in the several views.

In a preferred embodiment of the invention shown in the accompanying drawings by way of example but not of limitation, the device of the present invention is shown as forming an integral part of a flywheel assembly. The device may also be used for other purposes and as a part of other devices.

In the drawings forming a part of this specification:

Fig. 3 is a staggered sectional view taken in the direction of the arrows substantially on the section plane passing through the line 3—3 of Fig. 4;

Fig. 4 is a fragmentary sectional view taken in the direction of the arrows substantially on the section plane passing through the line 4—4 of Fig. 3;

Fig. 5 is a cut-away perspective view of the structure showing the assembled arrangement of the parts;

Fig. 6 is a perspective phantom view of the rotor and parts cooperating therewith, the control valve being shown in the fully closed position;

Fig. 7 is a view similar in part to Fig. 6, the control valve being shown fully opened, and the flow of the fluid being indicated by arrows, the device in this view being shown in operation as a disengaged clutch;

Fig. 8 is a view similar in part to Figs. 6 and 7, the control valve being shown partly open, and showing the device in operation as a speed reducer;

Fig. 9 is a side elevational view showing a modified form of the combined flywheel and hydraulic coupling shown in Figs. 1 and 2; and Fig. 10 is a sectional view taken on the line 10—10 of Fig. 9.

Figure 1:
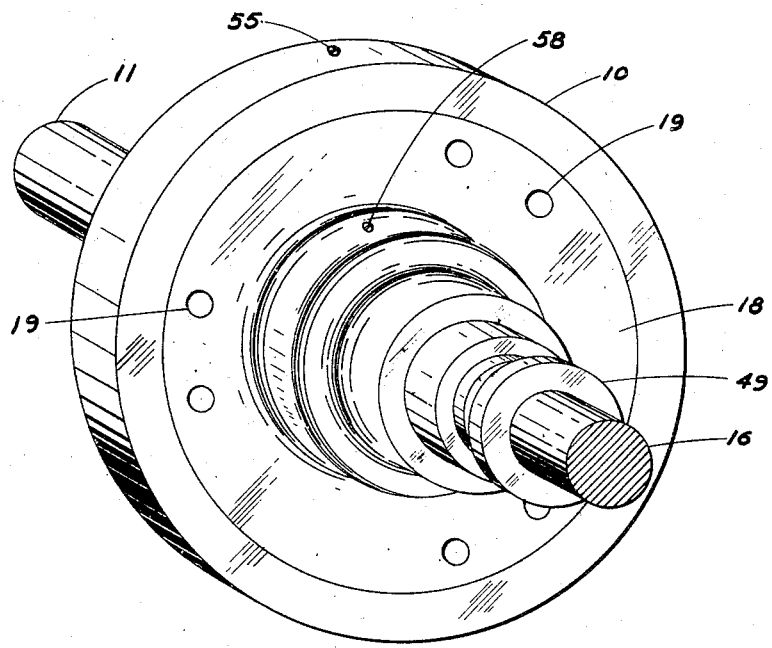
Fig. 1 is a perspective view of a combined flywheel and hydraulic coupling embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

It is to be understood that the combined clutch and transmission of the present invention has numerous uses such for example as in a combined clutch and transmission as shown in the drawings, or as an element of a differential gear or steering mechanism used chiefly in motor vehicle construction. The device also may be used in hoist constructions, as well as in hydraulic braking devices, and the like or similar uses, in which the reaction or resistance created by the flow of the hydraulic fluid is utilized and controlled to regulate the various functions of the device. It is to be understood that changes in the arrangement and location of parts to better adapt the device to perform its intended functions are within the scope of the present invention.

Figure 2:
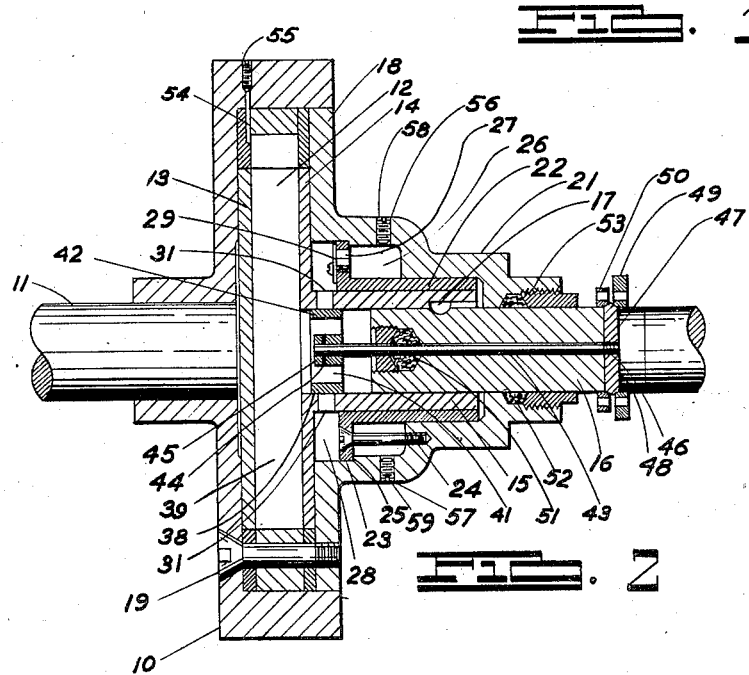
Fig. 2 is a longitudinal section through the structure shown in Fig. 1.

Referring to Figs. 1 and 2, a flywheel 10 is secured to a shaft 11 for rotation therewith. The shaft 11 in the particular embodiment here shown is the driving shaft driven from a prime mover, such for example as an internal combustion engine. The flywheel 10 is provided with a hollow interior chamber having a plurality of contoured chambers 35 therein. The chambers may be formed in a separate ring as here shown which is secured in the chamber. It is to be understood that the chambers 35 may be formed if desired directly in the walls of the chamber of the flywheel.

As shown particularly in Fig. 2, a rotor assembly 12 formed by spaced plates 13 and 14 is mounted in the chamber. The plates 13 and 14 are preferably formed so that when in the assembled position here shown, the interior of the rotor assembly 12 contains a duct system which permits circulation of the hydraulic fluid through the rotor and to and from the chambers 35. The plate 14 is preferably formed as the flanged end of a collar 15 which acts as a bearing member for the rotor assembly 12. The driven shaft 16 is connected as by the key 17 with the collar 15. Thus the rotor assembly 12, comprising the plates 13 and 14 and the collar 15, constitutes a rotating assembly which rotates with or causes the rotation of the shaft 16.

A hub 18 (Figs. 1 and 2) is secured to the open face of the flywheel 10 as by a plurality of screw-threaded studs 19 placed about the periphery of the flywheel and extending through the flywheel to effect screw-threaded connection with screw-threaded openings provided in the hub 18. Any other desired type of mounting of the hub may also be employed. The hub 18 is provided with a sleeve portion 21 in which is provided an antifriction bushing 22 to provide a load-carrying nongalling bearing surface for the collar 15. The antifriction bushing 22 is maintained in position by an annular collar 23 formed thereon and is connected to the inner portion of the sleeve 21 of the hub 18 as by the machine screws 24.

As shown in Fig. 2, a face of the member 23 fits tightly against a shoulder 25 formed in the said hub 18 and this provides a fluid-tight receptacle 26 of substantially rectangular cross section wihch extends concentrically of the hub 18. Two of the walls of the receptacle 26 are formed by the wall of the hub 18, and the other two walls are formed by a surface of the antifriction bearing 22 and the flange 23. This receptacle 26 provides a concentric reservoir for hydraulic fluid which is supplied to the mechanism as required through a plurality of small ducts 27 communicating with the chamber 28 each of which is provided with a spring-pressed flapper type valve 29 normally closing the discharge ends of said ducts. When the chamber 28 is normally filled with hydraulic fluid, the valves 29 will be held in place and keep the ducts 27 closed. As soon as the level of the fluid drops in the chamber 28, the pressures within the reservoir open the valves and the fluid from the receptacle 26 flows to the chamber 28 and the normal level of the fluid is restored.

The hydraulic fluid circulates throughout the device in a self-contained closed circuit which comprises the chamber 28 into which the hydraulic fluid flows through central ducts 31 from the hollow hub 32 (Fig. 4) of the rotor assembly 12. Ducts 33 and 34 communicate with the hub 32 and return the hydraulic fluid thereto from the pockets 35 formed in the body of the flywheel 10. Ducts 36 and 37 communicate with the chamber 28 and supply hydraulic fluid to the pockets 35.

It will be seen that the hydraulic device of the present invention is in effect a self-contained liquid pump. The total volume of the contents of the pump remains constant during all cycles of its operation. As long as the hydraulic medium is free to circulate from the chamber 28, through the ducts 36 and 37 to the pockets 35 and continually to return through the ducts 33 and 34 and the hub 32, there will be no difference in volume of the hydraulic fluid supplied and that returned and consequently there will be no work performed by the pump except the circulation of the hydraulic fluid.

It thus is necessary to provide a control which will regulate the action of the device. This is accomplished by the provision of the control valve 38 (Fig. 2) which is manually operated to open and close the control ducts 31 and thus regulate the flow of the hydraulic fluid from the hub 32 through the ducts 31. Operation of the valve 38 will cause a difference in the rate of flow and consequently in the volume of the hydraulic fluid supplied at a given time to the ducts 36 and 37 and that withdrawn from the pockets 35 by the ducts 33 and 34.

The difference in volume of hydraulic fluid supplied causes a difference in pressure in the chamber on opposed sides of the slide 39 and is thus a factor in determining the position of the rotor assembly 12 relative to the flywheel casing. The rotor assembly as shown in Fig. 5 includes a rigid slide 39 which is slidably mounted in the rotor assembly and has its opposite ends maintained in an intimate fluid-tight moving contact with the walls forming the pockets 35. When in the position shown in Fig. 5, the hydraulic fluid fills the spaces on each side of the member 39, and when a free flow of the hydraulic fluid is totally prevented, the rotor assembly 12 and the flywheel 10 are locked against relative rotation and coupled for a direct drive.

The ends of the slide member 39 are formed preferably of a hard wear-resisting metal, such for example as chromium, tungsten, molybdenum, or the like, and are formed with arcuate end sections to provide a positive arc contact with the curved surfaces of the chambers 35 and to prevent leakage of the hydraulic fluid around the end of the slide 39 which in effect will bypass the fluid from the intake side of the chamber 35 to the outlet side of the chamber 35. The wear-resisting ends of the slide 39 may be formed of separate sections of the hard metal and welded or otherwise secured to the body material forming the slide 39. In certain instances it will be preferable if the slide 39 is formed entirely of the hard wear-resisting alloy metal.

Various types of control valve mechanisms may be employed to perform the function of the control valve 38. Among such valves may be mentioned rotary valves, slide valves, and the like. A simple form of such mechanism is shown in Fig. 2 of the drawings and consists of a hollow piston 41 which is movable longitudinally of the shaft 16 and has a surface portion 42 which covers the control ducts 31 whenever the valve is moved to the closed position. Movement of the piston 41 may be effected by a shaft 43 which is screw threaded thereto and which is preferably provided with a lock washer 44 and a jamb nut 45. The opposite end of the shaft 43 is provided with a serrated end section 46 which is clamped between split clamping members 47 and 48. Clamping rings 49 and 50 engage the split clamping members 47 and 48 and hold the parts in positive engagement with the serrated end section of the shaft 43. Longitudinal movement of the shaft 43 and the piston 41 may be effected by any desired type of conventional mechanism, such for example as a hand or foot operated device mechanically connected with the rings 49 and 50. It is to be understood that if desired the valve may be actuated by various types of power-actuated members which would be controlled by a manual control device. All such arrangements are included within the scope of the term "manually controlled valve" as used herein.

As shown in Fig. 2, a stuffing box nut 51 is provided in a recess around the shaft 43 and prevents leakage of the hydraulic fluid around said shaft. To prevent leakage of the hydraulic fluid around the shaft 16, a packing 52 and a stuffing box nut 53 are preferably employed.

Before the device as above described is placed in operation, the reservoir 26 (Fig. 2) and the other portions of the hydraulic system must be filled completely with the hydraulic fluid. In filling the device it is important that all air be excluded from the chamber and with this in view I provide an air vent 54 (Fig. 2) which extends through the flywheel 10 and communicates with the chamber on the interior thereof. The air vent 54 is internally screw threaded and plugged by a removable screw-threaded plug 55. Threaded openings 56 and 57 (Fig. 2) are provided in the hub 18 and communicate with the reservoir 26 to permit filling of the reservoir and the device with the hydraulic fluid. In filling the reservoir 26, screw-threaded plugs 58 and 59 are removed and the hydraulic fluid is introduced into the lower opening. If the parts are in the position shown in Fig. 2, this is the opening 57. Air in the reservoir 26 is driven off through the opening 56.

During the filling operation the shaft 16 and the rotor assembly 12 are rotated so as to assure complete evacuation of the air from the rotor and the chamber. The hydraulic fluid first fills the reservoir 26, then flows into the chamber 28 and through the ducts 36 and 37. At the same time the fluid fills the hub 32 as well as the control ducts 31 and the ducts 33 due to the rotation of the rotor assembly just described. When the device has been filled completely with the hydraulic fluid, the screw-threaded plugs 58 and 59 are placed in the screw-threaded openings 56 and 57 and the air vent 54 is closed with the air vent plug 55.

During the operation of the device the volume of hydraulic fluid in the reservoir, the ducts, and the chamber remains substantially constant at all times. Rotation of the flywheel 10 tends to compress the fluid entrapped on one side of the slide 39, while the same movement tends to withdraw fluid from the opposite side of the slide 39. The hydraulic system on the opposed sides of the slide 39, as shown in Fig. 4, is connected through the hub 32, the control ducts 31 and the chamber 28. In effect, the hub 32 may be said to be the return reservoir and the chamber 28 the supply reservoir. The supply reservoir and the return reservoir are connected by the control ducts 31 (Fig. 2). The control ducts 31 are the critical control ducts for the entire mechanism.

While any preferred number of control ducts 31 may be employed, I prefer to use two ducts. The ducts 36 and 37 are large enough to alternately take the maximum flow of the hydraulic medium circulating through the device and the combined ducts 31 are large enough to also take the entire flow. As the ducts 36 and 37 intermittently take the full flow of the circulating medium, it is necessary that the combined cross-sectional area of the ducts 31, when open, is always equal to the cross section of the stream of hydraulic fluid flowing through either the duct 36 or the duct 37. Alternately there will be no flow in the ducts 36 and 37, and when the duct 36 is taking its maximum, the duct 37 is practically inoperative. The total area of the control ports 31, when open, thus adds up to the cross section required to pass a constant flow of the hydraulic medium while the ports 36 and 37 must alternately take the full flow. The ports 31 control the rate of flow of the hydraulic medium. The action of the control ducts 31 is to vary the time element required for the hydraulic medium to complete its circuit of flow through the duct system. Therefore, with the flywheel making full speed, the rotor or follower member would proportionately travel faster than when the engine was running at quarter speed. As the rate of flow through the throttle orifices would be approximately the same, neglecting pressure, then the following member would be running comparatively slower. The rate of flow of a liquid through such orifices and the volume flowing through these orifices involve the time element. This time element is controlled by varying the sizes of the ducts 31 as by the control valve 38. Due to "wire drawing," as the fluid flows through the control ducts there will necessarily be a heat reaction, and due to the resistance of the hydraulic medium flowing through the orifice, a percentage of the heat reaction will be turned into useful torque. The cross-sectional area of each duct in the duct system must be so related to the cross-sectional area of the other ducts in the system that if the control ducts 31 are open, a free circulation of the hydraulic fluid through a substantially unrestricted duct system is permitted.

In the view shown in Fig. 7, the control valve 38 is shown in the fully open position to permit a free and unrestricted circulation of the hydraulic medium within the duct system and chambers of the device. Thus rotation of the flywheel 10 causes pumping of the hydraulic medium but does not effect any substantial driven movement of the rotor assembly 12. When the parts are in this position and the control ports are fully open, the function of the device is that of a clutch. In this position, there is substantially no torque transmitted from the driving shaft to the driven shaft.

When the control ducts 31 are partially closed and the free flow of the hydraulic fluid is restricted, as indicated in Fig. 8, the volume of fluid which flows in a given unit of time from the hub 32 to the chamber 28 is reduced, thus reducing the volume of the fluid between the pocket 35 and the face of the slide 39. Since the centrifugal forces generated by the device in rotation are an important factor in the pressure exerted by the hydraulic column, it will be seen that a reduction in the volume of the hydraulic column during a given unit of time will result in the generation of lowered centrifugal forces exerted by such column. This, together with the unimpeded discharge of the fluid from the pocket 35 on the opposite side of the slide 39, permits the flywheel 10 to run ahead of the shaft 16 and the attached rotor assembly 12. This permits movement of the slide 39 relative to the rotor and permits it to move into another one of the pockets 35. The position of the slide 39 during this operation is shown in Fig. 8. This movement of the slide 39 will continue until the slide 39 comes to a position of rest in one of the pockets 35 in such a manner that the volume of the pocket adjacent the inlet duct 36 is equal to the volume of fluid being supplied through the control duct 31. When the parts reach this position, the flywheel and the rotor are again driven as a unit. When used in this manner the device functions as a speed reducer.

The restriction of the flow of the hydraulic fluid through the control ducts 31 as above described will cause the generation of heat and a consequent loss of power resulting therefrom. There will also be a difference in pressures of the fluid on the opposed sides of the slide 39. In certain instances it will undoubtedly be advisable to provide heat-radiating fins 10a or similar extension of the heat-radiating surface of the casing as shown in Figs. 9 and 10. In other instances the interval of time during which the device acts as a speed reducer is so short that the heat generated will not require the use of the heat-radiating fins.

When the control valve 38 is actuated in such a manner as to close entirely the control ducts 31, as shown in Fig. 6, the hydraulic fluid is trapped in the pocket 35 on each side of the slide 39, and the rotor assembly 12 and the flywheel 10 are locked for rotation as a unit. This provides a direct torque transmitting drive between the driving shaft and the driven shaft. In this use the device performs the functions of a direct torque coupling. When so used, it is to be noted that the device as distinguished from devices heretofore proposed in the art utilizes the hydraulic fluid to lock or entrap the slide member 39 and thus to prevent its movement. In numerous of the previously known devices hydraulic fluid under pressure is delivered against a movable member to effect its movement. In establishing the direct torque coupling relationship according to the present invention, the device of the present invention is a hydraulically actuated lock-up device acting through the volume of the entrapped fluid columns on opposite sides of the slide 39 and depends for its efficiency upon the substantial incompressibility of such entrapped fluids. This holds the slide 39 against movement in either direction.

The deduction in volume of the columns of the hydraulic fluid permits relative movement of the connected parts in the direction of such reduced column and thus the device operates to effect variation in the speed of the connected shafts without the building up of positive externally applied pressures on the hydraulic fluid.

Any desired type of fluid body may be employed in the device, such for example as oils, mercury, emulsions, and the like or similar substances and all such fluid bodies are included within the term "hydraulic fluid" as used herein.

It will be seen, therefore, that the device as herein shown may be changed or modified in details of construction and operation within the scope of the present invention and that it may provide a hydraulic coupling device, clutch and speed reducer as desired. In the instances here shown and described, the inlet and outlet ducts are connected in pairs on opposite sides of the slide 39 to provide a balanced construction and operation of the device.

As shown in the drawings, the chambered portion of the device is connected with the driving member and the rotor assembly 12 is connected with the driven member. It is to be understood that these connections may be reversed and that the rotor assembly 12 may be connected to the driving member and the chambered portion may be connected to the driven member.

Due to the changing positions of the slide 39 during the various cycles of operation of the device, its position relative to the columns of hydraulic fluid is varied to compensate for the changes in volume of the fluid on opposed sides of the slide. Considered as a lever, the slide 39 acts on the hydraulic columns through a fulcrum, which is changed to compensate for changes in the volumes of the column which supplies the actuating force to the lever. Thus the principle of operation is similar to that of an incremental fulcrum which is constantly changed to compensate for change of forces imposed on the lever. In the device here shown, one hydraulic column is in effect the fulcrum, while the other hydraulic column supplies the force exerted on the lever. This, together with the creation of differential pressures on opposed sides of the slide 39 by restricting the free flow of the hydraulic fluid, explains the basic principle employed in the device of the present invention when used as a speed reducer. When used as a clutch, the device of the present invention is in effect a self-contained, constant flow, closed cycle liquid pump. When used as a direct drive coupling, the device of the present invention is a hydraulic lock-up device.

I claim:

1. A hydraulic coupling comprising a casing having a contoured chamber, a rotor mounted in said chamber and maintained in a moving fluid-tight contact with the wall of said chamber at a plurality of points to provide a plurality of separate substantially fluid-tight pockets between the walls of said chamber and the surface of said rotor, a slide member carried by said rotor and having its opposed ends extending through said pockets and maintained in moving fluid-tight contact with the walls of said chamber, a hydraulic circuit for circulating a hydraulic fluid through said pockets and comprising a feeding duct disposed in said rotor and communicating with an inlet port on the periphery of said rotor adjacent one side of said slide, a return duct disposed in said rotor and communicating with a discharge port on the periphery of said rotor adjacent the opposite side of said slide, and a control valve to regulate the flow of the hydraulic fluid through said circuit whereby the volume of hydraulic fluid in said pockets on opposed sides of said slide is varied to effect control of the movement of said rotor in said chamber.

2. A hydraulic coupling as specified in claim 1 and in which the slide member is a single element having a length substantially coextensive with any diameter taken through said contoured chamber from any point on the inner surfaces of said pockets.

3. A hydraulic coupling as specified in claim 1 and in which the separate substantially fluid-tight pockets are of substantially uniform sizes and are equally spaced in the walls of said chamber.

4. A hydraulic coupling as specified in claim 1 and in which the rotor is concentrically mounted in said chamber.

5. A hydraulic coupling as specified in claim 1 and in which a reservoir of hydraulic fluid is provided to maintain a predetermined level of hydraulic fluid in said hydraulic circuit by the flow of hydraulic fluid through a plurality of feeding ducts in said reservoir, and an automatic valve associated with each of said ducts and controlled by variations in volumes and pressures of the hydraulic fluid in said reservoir and that flowing through said hydraulic circuit.

6. A combined coupling, speed reducer and clutch comprising a self-contained constant flow, closed cycle, fluid pump having a casing adapted for connection with a driving or a driven shaft and having a plurality of symmetrically disposed fluid-tight chambers therein and an impeller adapted for connection with the other of said shafts and having a slidable blade whose ends are maintained in fluid-tight sliding contact with the walls of said chambers, a hydraulic circuit formed within said impeller and comprising an inlet port and a discharge port adjacent each end of said slide and separated from each other thereby, said ports each communicating with a central duct system in said impeller and adapted respectively to withdraw and discharge hydraulic fluid simultaneously in two or more of said chambers, and a control valve for regulating the flow of hydraulic fluid through said central duct system and ports thereby to selectively control or prevent relative movement between said casing and said impeller.

7. A combined hydraulic clutch and power transmitting coupling comprising a rotor connected to one of the driving and driven members and rotatably mounted in a contoured chamber provided in a casing connected to the other of said driving and driven members, said casing being provided with a plurality of heat radiating fins or ribs, said rotor having a circumferential contact with a plurality of spaced points in said chamber and maintained in moving fluid-tight contact therewith to form with the contoured portions of said chamber a plurality of separate substantially fluid-tight pockets, means for controlling the relative rotation of said rotor and casing and comprising a plate slidably mounted in said rotor and having its opposed ends extending through said pockets and maintained in moving fluid-tight contact with the walls of said chamber, a hydraulic circuit formed in said rotor and comprising a central duct system for circulating hydraulic fluid through said pockets and including inlet ports communicating with said duct system and pockets adjacent the ends of said plate and discharge ports communicating with said duct system and said pockets adjacent the ends of said plate and at points separated by said plate from said inlet ports, and a control valve interposed in said duct system for controlling the amount of hydraulic fluid supplied to said pockets during a predetermined time interval whereby said rotor and casing may be selectively connected for rotation at the same or different speeds or disconnected for independent rotation thereof.

8. A hydraulic coupling, speed reducer and clutch comprising a self-contained constant flow, closed cycle fluid pump having a pumping chamber formed with contoured walls, a rotor mounted in said chamber, a slide member carried by said rotor and terminating in end surfaces maintained in contact with the contoured walls of said pumping chamber, a hydraulic circuit for circulating hydraulic fluid through said chamber and comprising a feeding duct system formed in said rotor and communicating with an inlet port adjacent one side of said slidable means, a return duct system formed in said rotor and communicating with a discharge port adjacent the opposite side of said slidable means, and a control valve adapted to regulate the flow of the hydraulic fluid through said duct systems whereby the volume of hydraulic fluid in said chamber on opposite sides of said slide member may be varied to control the relative movement of said rotor and said pumping chamber.

9. A hydraulic coupling, speed reducer and clutch comprising a self-contained constant flow, closed cycle fluid pump having a pumping chamber formed with contoured walls, a rotor mounted in said chamber, slidable means carried by said rotor and having end portions in contact with the contoured walls of said pumping chamber, a hydraulic circuit for circulating hydraulic fluid through said chamber and comprising a feeding duct system formed in said rotor and communicating with an inlet port adjacent one side of said slidable means, a return duct system formed in said rotor and communicating with a discharge port adjacent the opposite side of said slidable means, a control valve adapted to regulate the flow of the hydraulic fluid through said duct systems whereby the volume of hydraulic fluid in said chamber on opposite sides of said slidable means may be varied to control the relative movement of said rotor and said pumping chamber and a reservoir containing hydraulic fluid and having a supply duct communicating with said feeding duct system and adapted to maintain a predetermined level of hydraulic fluid in said hydraulic circuit, and an automatic valve associated with said supply duct and controlled by variations in the volumes and the pressures of the hydraulic fluid in said reservoir and that flowing through said hydraulic circuit.

DAVID E. ROSS.